(12) United States Patent
Cooper (10) Patent No.: US 11,440,481 B1
(45) Date of Patent: Sep. 13, 2022

(54) TRUCKBOX AND PANEL LIFT APPARATUS

(71) Applicant: Prentice C. Cooper, Conroe, TX (US)

(72) Inventor: Prentice C. Cooper, Conroe, TX (US)

( * ) Notice: Subject to any disclaimer, the term of this patent is extended or adjusted under 35 U.S.C. 154(b) by 0 days.

(21) Appl. No.: 17/214,055

(22) Filed: Mar. 26, 2021

(51) Int. Cl.
*B60R 9/06* (2006.01)
*B60R 5/04* (2006.01)

(52) U.S. Cl.
CPC .............. *B60R 9/06* (2013.01); *B60R 5/041* (2013.01)

(58) Field of Classification Search
CPC ..... B60R 9/06; B60R 5/041; B60R 2011/008; B60R 2011/0084; B60R 2011/0092
USPC ......................................................... 224/403
See application file for complete search history.

(56) References Cited

U.S. PATENT DOCUMENTS

| | | | | |
|---|---|---|---|---|
| 4,603,901 A | * | 8/1986 | McIntosh | B60P 3/34 296/26.05 |
| 4,848,830 A | * | 7/1989 | Parson | B60P 3/32 296/26.05 |
| 4,955,660 A | * | 9/1990 | Leonard | B60P 3/341 296/100.18 |
| 5,303,969 A | * | 4/1994 | Simnacher | B60R 9/00 224/543 |
| 6,592,162 B2 | * | 7/2003 | Felix | B62D 33/0276 296/3 |
| 7,104,583 B2 | * | 9/2006 | Clare | B60R 11/06 224/404 |
| 7,182,177 B1 | * | 2/2007 | Simnacher | B66F 3/12 224/404 |
| 8,684,439 B1 | * | 4/2014 | Calvert | B60P 3/40 296/3 |
| 8,690,219 B1 | * | 4/2014 | Calvert | B60P 3/40 296/3 |
| 8,857,684 B1 | | 10/2014 | Calvert | |
| 9,156,412 B1 | * | 10/2015 | Calvert | B60P 7/08 |
| 9,694,754 B2 | * | 7/2017 | Sterling | B60R 5/04 |
| 9,862,333 B1 | * | 1/2018 | Jones | B60R 9/065 |
| 9,963,081 B1 | * | 5/2018 | Taylor | B66F 7/08 |
| 10,328,863 B2 | * | 6/2019 | Spahn | B60R 11/06 |
| 10,399,478 B2 | | 9/2019 | Dorminey et al. | |
| 10,399,511 B2 | | 9/2019 | Peter | |
| 10,435,082 B1 | * | 10/2019 | Kupina | B60P 1/486 |
| 2003/0127875 A1 | * | 7/2003 | Hornick | B60P 7/08 296/32 |
| 2003/0173758 A1 | * | 9/2003 | Badger | E04H 15/48 280/656 |
| 2008/0079277 A1 | * | 4/2008 | Wethington | B60R 9/0485 296/3 |
| 2011/0284602 A1 | | 11/2011 | Lamouroux | |

\* cited by examiner

*Primary Examiner* — Peter N Helvey
(74) *Attorney, Agent, or Firm* — Dale J. Ream (57) ABSTRACT

A truck box and side panel lift apparatus for a pickup truck of a type having cab and bed portions includes a toolbox that extends between the side walls of the truck bed. The apparatus includes a pair of bed side panels that are situated inside the side walls of the truck. A pair of support members are slidably coupled to front ends of bed side panels and are slidably movable between retracted configurations displaced away from the toolbox and deployed configurations positioned underneath the lateral ends of the toolbox, respectively. The apparatus includes lift assemblies coupled to the bed side panels for raising or retracting the bed side panels. The toolbox is raised simultaneously with the bed side panels but only if the support members are deployed under ends of the toolbox at the time the side panels are raised.

20 Claims, 6 Drawing Sheets

TRUCKBOX AND PANEL LIFT APPARATUS

BACKGROUND OF THE INVENTION

This invention relates generally to storage and carrying devices and, more particularly, to a truck box and panel lift apparatus for increasing the volume of a truck bed available to receive a payload.

The volume of available space within the confines of a truck bed often results in an owner or contractor having to make multiple round trips to move a load of materials from one location to another. Making more trips than absolutely necessary not only wastes time and reduces productivity, but also results in more emissions of exhaust into the atmosphere. In the past, solutions to this problem have been to borrow or rent a bigger truck, make multiple trips, or simply try to do a job with fewer materials. In addition, positioning a lateral toolbox in the bed portion of the truck bed immediately behind the cab portion is common amongst truck owners, especially contractors. While having a lateral toolbox for storing tools and materials is convenient, this only limits the ability to maximize available space in the truck bed for cargo.

Various devices have been proposed in the prior art for increasing the volume of a truck bed, such as installing a semi-permanent storage rack, including a false floor under which may be installed slide out bins, or the like. Although presumably effective for their intended purposes, the existing and proposed devices are still insufficient to allow a payload to be stacked higher than the traditional sidewalls of the truck bed as well as the space taken up by the lateral toolbox.

Therefore, it would be desirable to have a truck box and panel lift apparatus having a pair of auxiliary side panels that may be selectively raised or lowered so as to adjust and secure a payload that extends upwardly above the stock sidewalls of the truck bed. Further, it would be desirable to have a truck box and panel lift apparatus in which the lateral toolbox may be raised simultaneously with the auxiliary side panels so as to maximize a volume of available cargo space.

SUMMARY OF THE INVENTION

A truck box and side panel lift apparatus according to the present invention is for attachment to a pickup truck of a type that includes a cab portion and a bed portion having a floor and a pair of laterally spaced apart side walls extending upwardly from the floor, includes a toolbox situated proximate the cab portion of the pickup truck and having a laterally elongate configuration that extends between the first and second side walls of the bed portion, respectively. The apparatus includes a pair of bed side panels situated inwardly adjacent and parallel to the pair of side walls of the pickup truck, respectively, each one of the pair of side panels having a front end proximate lateral ends of the toolbox, respectively. A slider assembly includes a pair of support members slidably coupled to the pair of bed side panels adjacent the front ends thereof, respectively, for slidably moving, when actuated, the pair of support members between retracted configurations displaced from the toolbox and deployed configurations positioned underneath the lateral ends of the toolbox, respectively.

The apparatus includes a pair of forward lift assemblies each being operatively coupled to the front ends of the pair of bed side panels, respectively, each forward lift assembly having a cylinder and a piston received in the cylinder and slidably movable, when actuated, between a retracted configuration substantially retracted inside the cylinder and an extended configuration substantially extending upwardly out of the cylinder. An upper end of each piston is attached to a respective bed side panel such that the respective bed side panel is raised when the piston is moved toward the extended configuration.

Therefore, a general object of this invention is to provide a truck box and side panel lift apparatus that provides a pair of auxiliary side panels that may be selectively raised upwardly to secure a taller payload of materials.

Another object of this invention is to provide a truck box and side panel lift apparatus, as aforesaid, having a pair of slider assemblies that, when deployed, cause a truck's lateral tool box to be raised simultaneously with raising the pair of bed side panels.

Still another object of this invention is to provide a truck box and side panel lift apparatus, as aforesaid, that forms an elevated cargo rack.

Yet another object of this invention is to provide a, as aforesaid, that conserves the environment by decreasing the number of loads needed to move a complete payload.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is an isolated view on enlarged basis taken from FIG. 1a;

FIG. 1c is an isolated view on enlarged basis taken from FIG. 1a;

FIG. 2b is an isolated view on enlarged basis taken from FIG. 2a;

FIG. 3b is an isolated view on enlarged basis taken from FIG. 3a;

FIG. 5b is an isolated view on enlarged basis taken from FIG. 5a;

FIG. 6b is an isolated view on enlarged basis taken from FIG. 6a.

DESCRIPTION OF THE PREFERRED EMBODIMENT

A truck box and side panel lift apparatus according to a preferred embodiment of the present invention will now be described with reference to FIG. 1a to 6b of the accompanying drawings. The truck box and side panel lift apparatus 10 includes a toolbox 15, a pair of bed side panels 20, a pair of slider assemblies 30, a pair of forward lift assemblies 40, and a pair of rearward lift assemblies 44.

The truck box and side panel lift apparatus 10 is installed on or used with a pickup truck of a type having a cab portion (for a driver) and a bed portion 12 suitable for hauling a payload of equipment or materials, the bed portion 12 having a floor 13 (bottom wall), and a pair of upstanding side walls 14 extending upwardly from peripheral edges of the floor 13. It is understood that an upper edge of each side wall 14 may be referred to as a top rail. Preferably, the pair of side walls 14 each define a vertical plane and are parallel and laterally spaced apart from one another. These structures of a traditional bed portion 12 of a pickup truck will be substantially unchanged by the present invention but are given as context and providing critical structural attachment points for the invention described and recited below. In other words, a truck bed is not claimed as the invention although it provides support for the recited invention as will become clear in the following discussions.

The truck box and side panel lift apparatus 10 includes a cross bed truck toolbox 15 having a laterally elongate configuration that expands between the pair of side walls 14 of the bed portion 12 of the pickup truck. Preferably, the toolbox 15 includes opposed ends that extend outwardly of the upper rails and side walls of the bed portion 12, as shown. In an embodiment, the toolbox 15 may include a bottom wall 16 and a plurality of sidewalls (front, back, and side walls) extending upwardly from the bottom wall 16. Together, the walls of the toolbox 15 define an interior area capable of holding tools, fasteners, written materials, and other supplies useful to a contractor or the owner of the pickup truck in general. The toolbox 15 may also include a lid 17 that is pivotally coupled to an upper edge of one of the sidewalls and is movable between a closed configuration that does not allow access to the interior area and a raised or open configuration allowing access to the interior area. By the present invention, the toolbox 15 may be selectively raised and lowered as may be desirable to enable the bed portion 12 to be loaded with additional payload as will be described later in greater detail.

The truck box and side panel lift apparatus 10 may include a pair of bed side panels 20, each bed side panel 20 being inwardly adjacent to a respective one of the pair of side walls 14 of the pickup truck, respectively. In other words, the pair of bed side panels are, essentially, auxiliary sidewalls for the truck bed portion. And, as will be explained later, the pair of bed side panels 20 may be lifted or raised independently of the toolbox 15 or, alternatively, raised simultaneously with the toolbox 15. Each bed side panel 20 defines a front end 22 and a rear end 24 opposite the front end 22 as well as a top rail 25 extending therebetween. For clarity, the front end 22 is the upstanding end wall nearest the toolbox 15 and cab portion of the pickup truck whereas the rear end 24 corresponds to the upstanding end wall that would be nearest to a bumper or tailgate (not shown) of a pickup truck. It will be understood that each side panel 20 has a very thin construction having a flat or planer surface and the front end 22, rear end 24, and top rail 25 may be in the form of a lip or wall extending inwardly from the planer side panel 20 and perpendicular to its planer surface thereof.

Figure 3A:
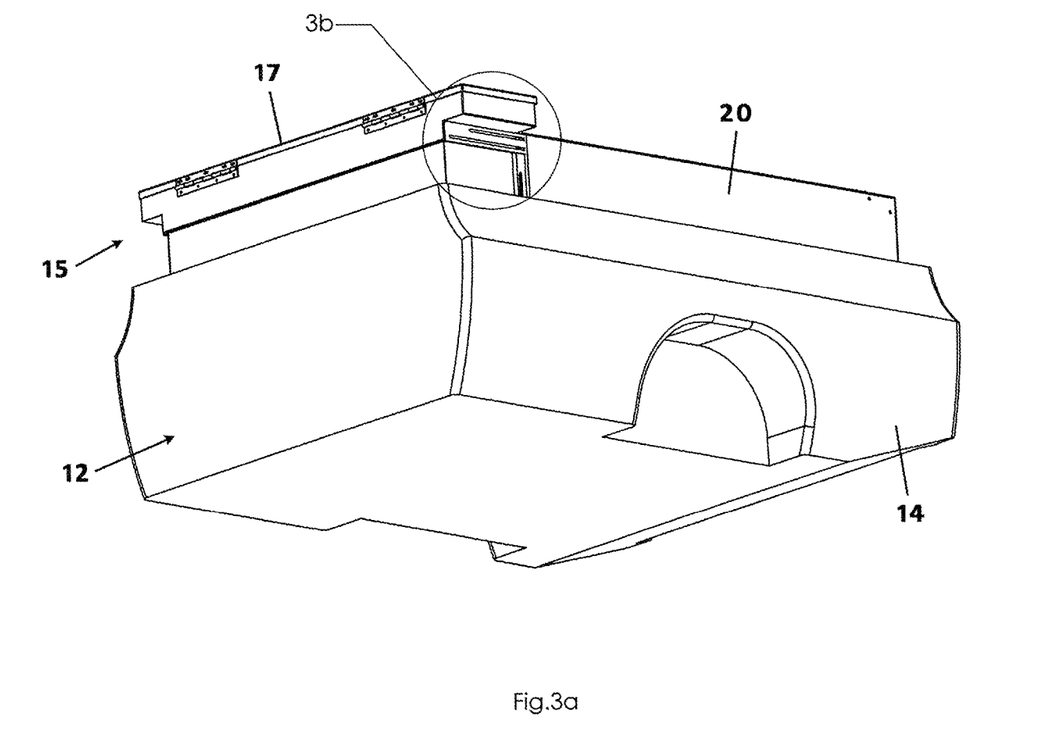
FIG. 3a is a perspective view from an angle outside the truck bed portion illustrating grooves for receiving a slider assembly.
Figure 3B:
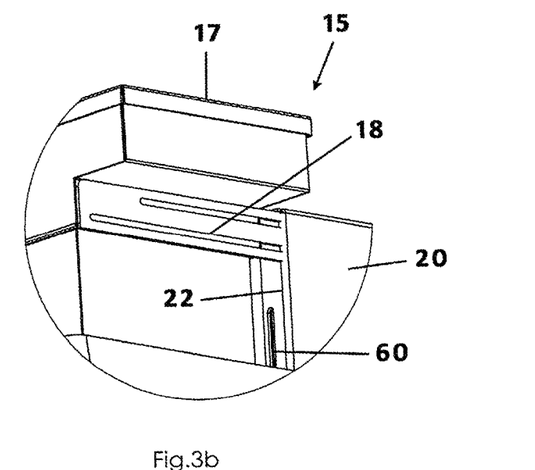

In another aspect, of the truck box and side panel lift apparatus 10 includes a pair of slider assemblies 30 that are each configured to selectively and slidably move under a respective end of the toolbox 15 such that the toolbox 15 is raised simultaneously with a lifting of the pair of bed side panels 20 as described below. Each slider assembly 30 includes a support member 32 defining a slot 31 and is secured to a corresponding bed side panel 20 proximate the front end 22 thereof with a fastener 34 (such as a bolt) extending through the slot 31 that may be tightened or loosened. Accordingly, the fastener may be loosened so that the support member 32 may be slidable along its slot 31 to positions either under an end of the toolbox 15 or rearwardly displaced from the toolbox 15. Then the fastener 34 may be tightened in the slot 31 to prevent slidable movement. More particularly, each support member 32 has a generally linear and elongate configuration that is slidably movable between a retracted configuration displaced from the toolbox 15 (rearward and not under the toolbox 15) and a deployed configuration positioned underneath a respected lateral and of the toolbox 15. In other words, respective support member 32 are movable so as to either engage and prepare the toolbox 15 for a lifting operation or to disengage the toolbox 15 from a next lifting event. In an embodiment, an exterior surface of the toolbox 15 may define one or more grooves 18 that are complementary to a support member 32 of a slider assembly 30 for receiving said support member 32 when deployed (FIGS. 3a and 3b). In an embodiment, each slider assembly 30 is manually actuated by a user, i.e., the user slides each support member 32 forward or rearward.

In another embodiment (not shown), each slider assembly may include an actuator operative to move a respective support member 32 between the deployed and retracted configurations. The actuator may be a linear actuator, a motor, a piston/cylinder combination, hydraulics, or the like. Accordingly, a user may actuate the support members manually or, in an embodiment, by pressing an input button that is electrically connected to respective actuators.

In another aspect, the truck box and side panel lift apparatus 10 includes a pair of forward lift assemblies 40 and a pair of rearward lift assemblies 44. For the sake of clarity and illustration, it will be understood that while only one of the forward lift assemblies 40 and one of the rearward lift assemblies 44 is shown, the un-shown forward and rearward assemblies have an identical construction to those that are shown. Further, it will be understood that a forward lift assembly has substantially the same construction as a rearward lift assembly except as otherwise noted.

Viewed generally, a forward lift assembly 40 is coupled to and associated with a bed side panel 20 so as to raise the associated bed side panel upwardly when the forward lift assembly 40 is energized (or otherwise actuated). Preferably, of course, the forward lift assemblies 40 and rearward lift assemblies 44 are in electrical communication with one another and are actuated simultaneously so as to raise or lower the pair of bed side panels 20. Communication between the various bed side panels may be via wireless communications or through actual wires (not shown).

In an embodiment, a forward lift assembly 40 may include a piston/cylinder combination configured for selectively raising or lowering associated bed side panels 20. A piston/cylinder combination may include a cylinder 41 defining an interior space and a piston 42 (such as a rod) received in the cylinder 41 and slidably movable relative to the cylinder 41. The piston 42 may include a tip or plate that is operatively coupled to a respective bed side panel 20. When energized, the piston 42 is moved slidably to an extended configuration substantially extending upwardly outside of the interior space of the cylinder 41 or, oppositely, moved to a retracted configuration substantially inside the interior space of the cylinder 41. Similarly, the rearward lift assembly 44 may include a piston/cylinder combination having a rear cylinder 45 and rear piston 46 slidably movable therein. It is understood that the piston/cylinders may utilize air, electricity, or hydraulics.

Therefore, it can be seen that the pair of bed side panels 20 are raised upwardly and above the side rails and side walls 24 of the bed portion 12 when respective pistons 42 are energized or otherwise actuated to their extended configurations, respectively. Correspondingly, it can be seen that the toolbox 15 is raised upwardly simultaneously with a raising of the pair of bed side panels 20 but only if the support members 32 are deployed under opposing ends of the toolbox 15 as described above. However, if the support members 32 are displaced rearwardly (i.e., are no longer engaged with the toolbox 15), the pair of bed side panels 20 will be extended upwardly away from the horizontal plane of the toolbox 15 upon actuation of associated lifting assemblies.

Figure 1A:
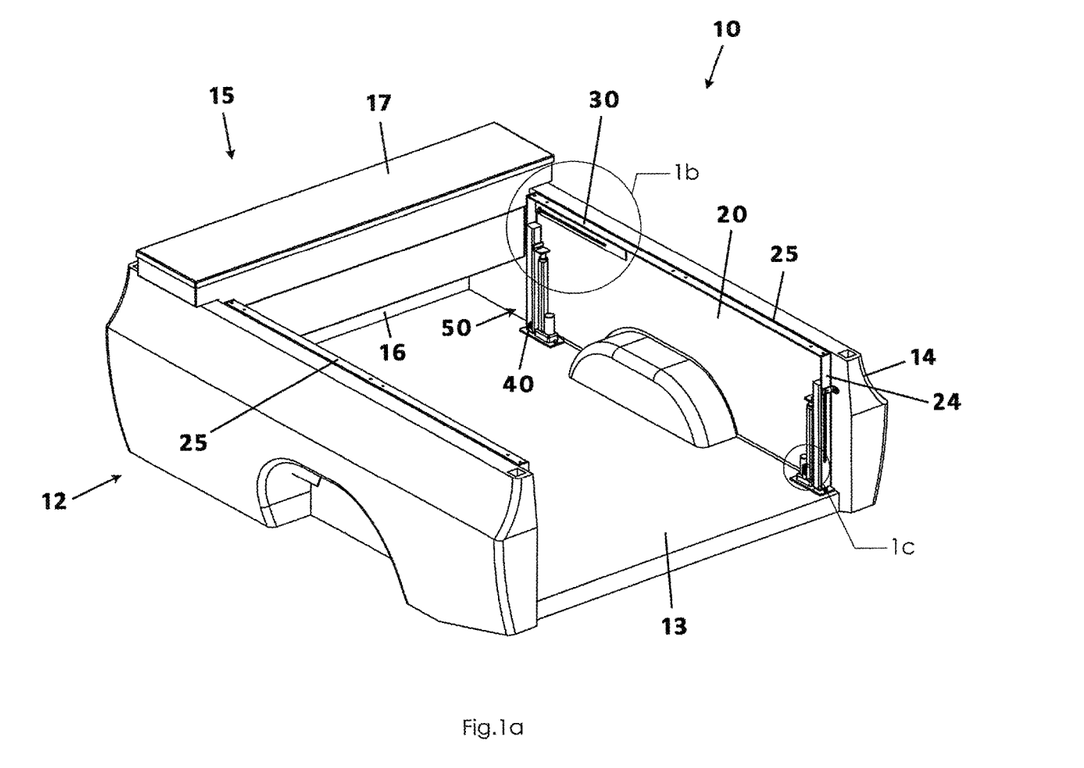
FIG. 1a is a perspective view of a truck box and panel lift apparatus according to a preferred embodiment of the present invention, illustrated with a slider assembly in a retracted configuration.
Figure 1B:
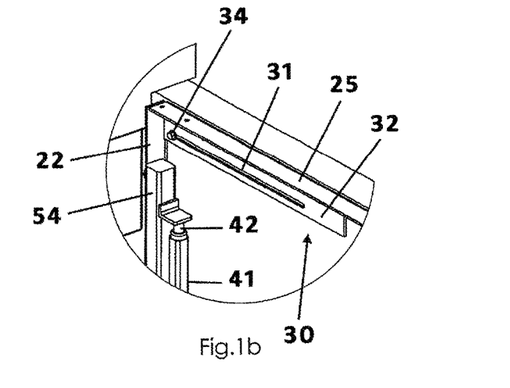
Figure 1C:
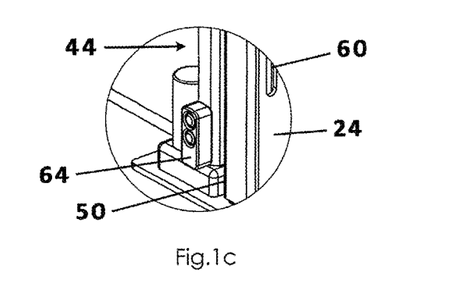
Figure 2A:
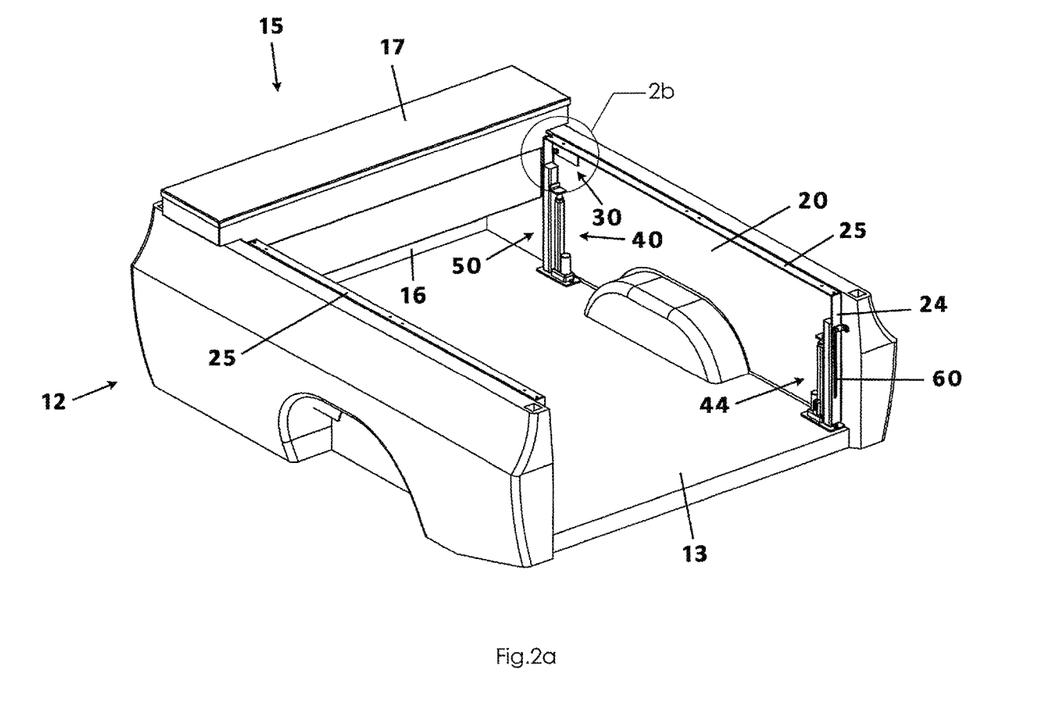
FIG. 2a is a perspective view of the truck box and panel lift apparatus as in FIG. 1a, illustrated with the slider assembly in a deployed configuration.
Figure 2B:
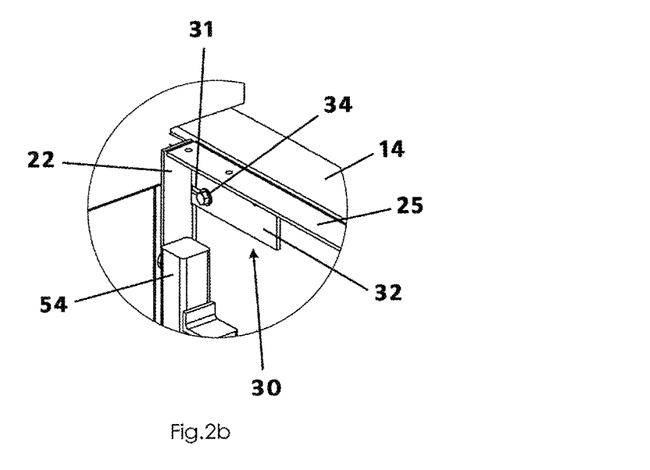

In a related aspect, an input controller 64 may be electrically connected to at least one of the lift assemblies, such as to a rearward lift assembly 44 as shown in FIG. 1c. As shown, the input controller 64 may include a lift button and a release button although other input technology may be used such as a touchscreen, voice recognition, up/down arrows, or the like.

In another aspect, the truck box and side panel lift apparatus 10 includes a pair of front support assemblies 50 and a pair of rear support assemblies 50 having a construction that is identical to the front support assemblies 50 and, as such, only the front support assemblies 50 will be described in this specification and the same reference character 50 will be assigned to both. First, the support assemblies 50 should not be confused with the support members 32 described above. Second, each front support assembly 50 is an intervening support and guide structure positioned between a respective lift assembly and a corresponding bed side panel 20. Specifically, each support assembly 50 is located adjacent to and just inside the front end 22 and rear end 24 of a bed side panel 20, respectively. This means that a piston of a lifting assembly is coupled to an associated support assembly and the associated support assembly 50 is attached to the associated bed side panel 20, accordingly, it can be seen that actuation of a lifting assembly first raises an associated support assembly 50 which simultaneously raises an associated bed side panel 20 and, in the case where an associated support member 32 actuated underneath the toolbox 15 as described above, the toolbox is raised as well.

More particularly each front support assembly 50 (and, similarly each rear support assembly 50) includes a lower portion 52 that may be bolted to the floor 13 of the truck bed portion 12 and an upper portion 54 that is co-linear with the lower portion 52 and coupled to a respective piston. Further, the upper portion 54 may be a sleeve and the slidably movable, when actuated, between a lowered configuration adjacent a respective cylinder of a respective front support assembly 50 and a raised configuration extending upwardly and away from the associated lower portion 52. In other words, the upper portion 54 (sleeve) is slidably movable upon movement of an associated piston to which it is attached.

In a related aspect, the front end 22 and rear end 24 of each bed side panel 20 defines a guide slot 60 having a generally linear and upstanding configuration and that will be useful for stability and guidance as an associated bed side panel 20 is moved upwardly or downwardly. More particularly, a respective upper portion 54 includes a fastener 62, such as an L-shaped bracket, having a first section 62a coupled to a respective side wall 14 of the pickup truck bed portion 12 and a second section 62b slidably situated along said guide slot 60 such that the upper portion 54 is slidably movable along the guide slot 60 as a bed side panel 20 is moved between the lowered configuration and the raised configuration. This attachment is shown explicitly in FIGS. 1a and 2a and shown enlarged but removed from the bed portion 12 in FIGS. 5a and 6a. To be clear, the fastener 62 is fixed once screwed or bolted to the adjacent side wall 14 of the bed portion 12 but then does not hinder vertical movement of a bed side panel 20, i.e., the guide slot 60 enables the bed side panel 20 to move freely.

Figure 4:
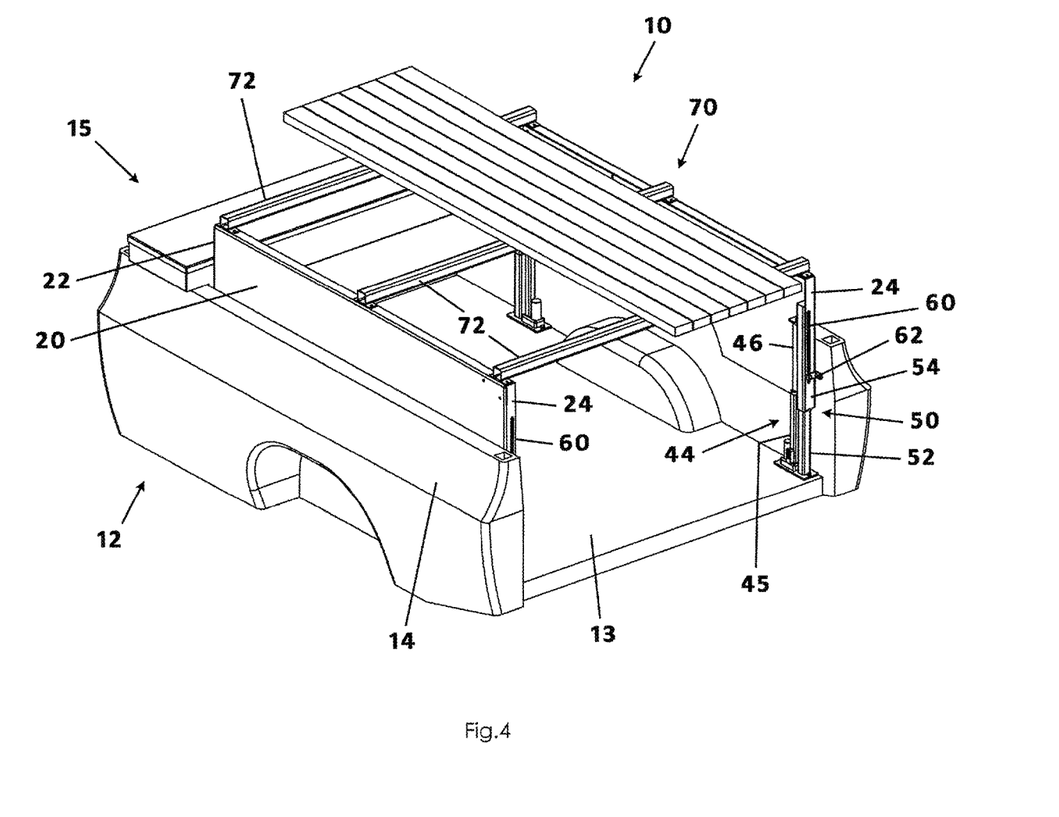
FIG. 4 is a perspective view of the truck box and panel lift apparatus according to the present invention, illustrated in a raised configuration and with a cargo rack installed atop the pair of bed side panels.
Figure 5A:
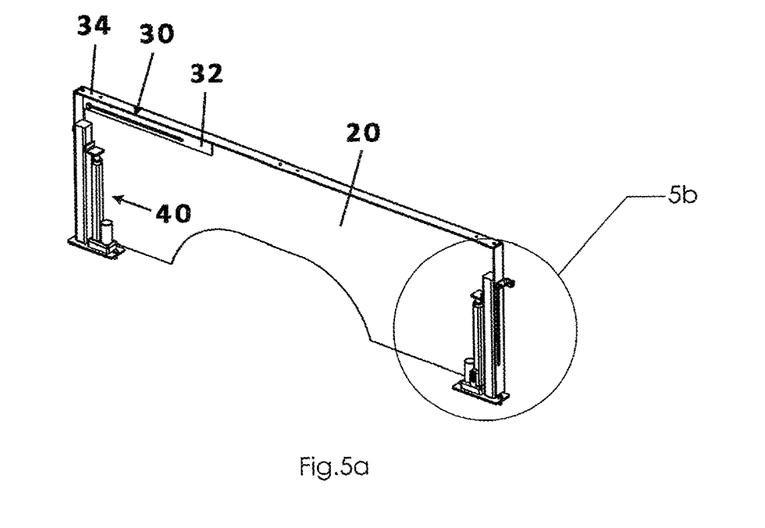
FIG. 5a is a perspective view of a bed side panel removed from the rest of the invention for clarity, illustrated with frontward and rearward lift assemblies in retracted or lowered configurations.
Figure 5B:
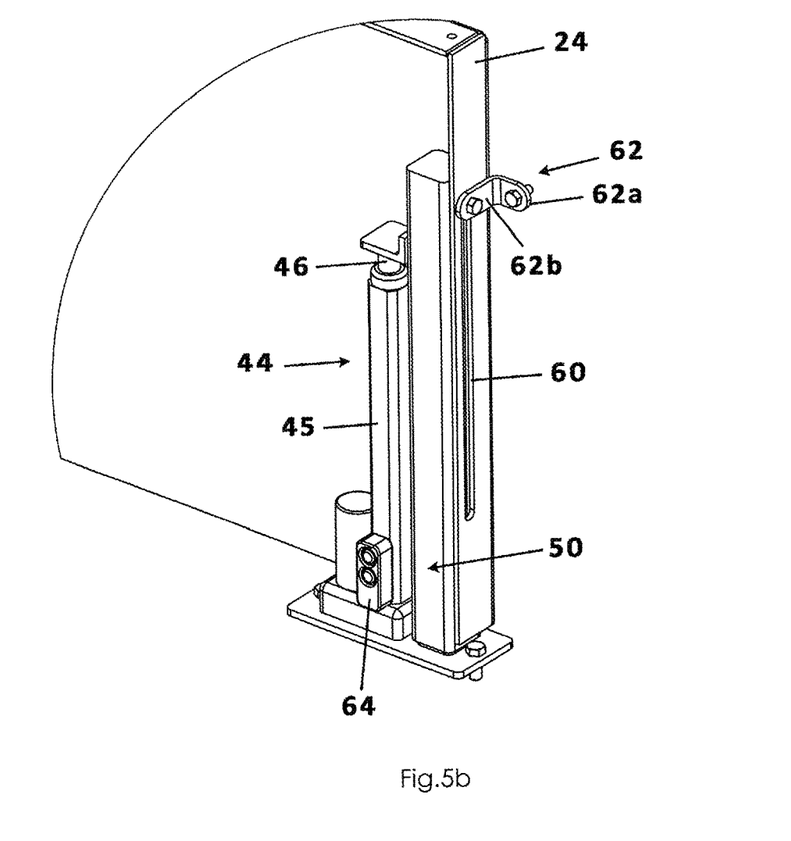
Figure 6A:
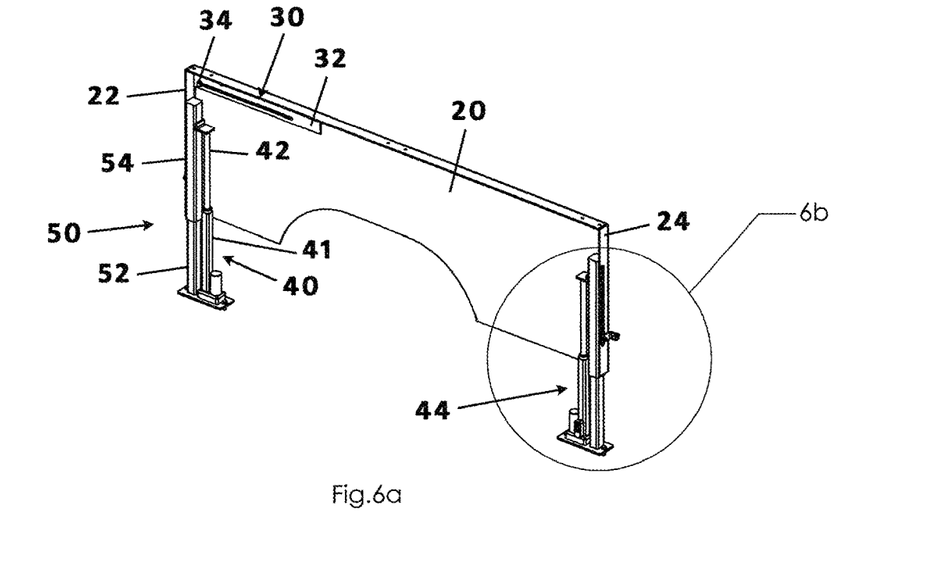
FIG. 6a is a perspective view of a bed side panel removed from the rest of the invention for clarity, illustrated with frontward and rearward lift assemblies in extended or raised configurations.
Figure 6B:
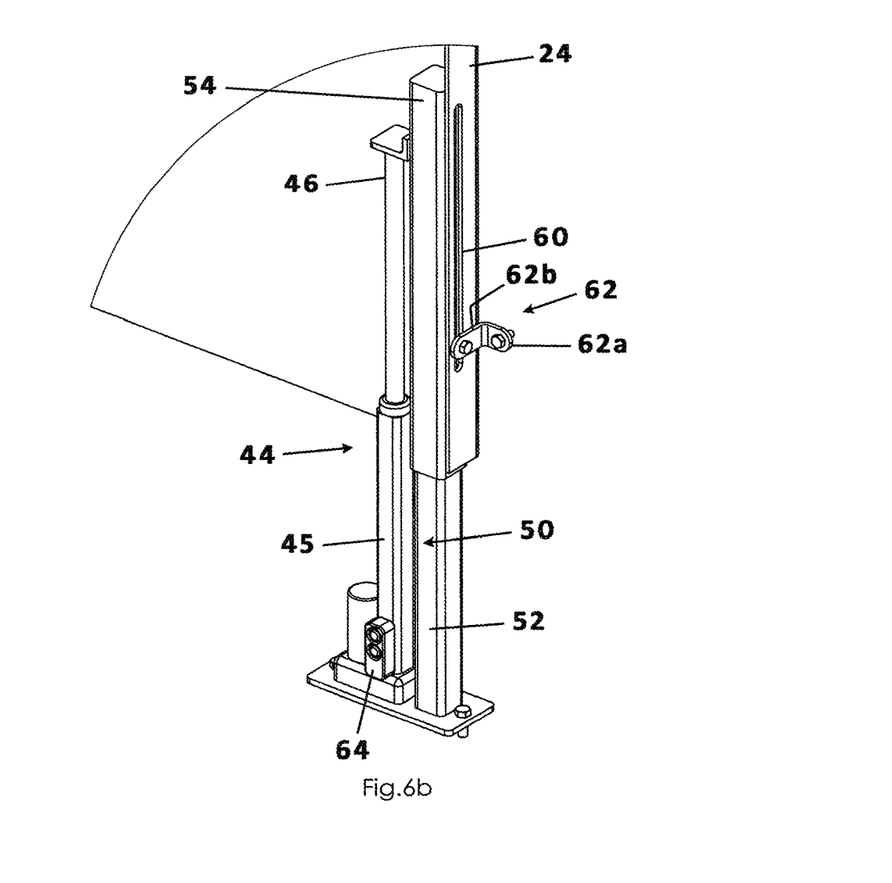

As shown particularly in FIG. 4, the truck box and side panel lift apparatus 10 may be converted for use as an elevated cargo rack 70. In other words, the pair of bed side panels 20 may be raised as described above and then beams 72 may be situated laterally between upper edges of the pair of bed side panels 20. In an embodiment, the beams may be secured to respective upper edges, such as with bolts, screws, plates, or mating in recesses defined by the upper edges. Cargo such as boards, pipes, ladders, and the like may be loaded onto the beams of the cargo rack 70 and, preferably, be secured thereto with straps or the like.

In use, the truck box and side panel lift apparatus 10 provides an opportunity to load and carry more payload in the bed of the pickup truck to which it is installed. In most instances, the pair of bed side panels 20 may be deployed to extend upwardly so as to contain a deeper payload, i.e., the bed side panels 20 may be extended taller than the stock side walls of a bed portion 12 of the truck. In other instances, such for longer materials such as long boards, ladders, or the like, it would be advantageous to raise the lateral toolbox 15 that is common on pickup trucks. The truck box and side panel lift apparatus 10 includes a pair of slider assemblies 30 that, when deployed, cause the toolbox 15 and pair of bed side panels 20 to be deployed and raised simultaneously so as to increase the volume of usable bed space for receiving a load.

It is understood that while certain forms of this invention have been illustrated and described, it is not limited thereto except insofar as such limitations are included in the following claims and allowable functional equivalents thereof.

The invention claimed is:

1. A truck box and side panel lift apparatus for attachment to a pickup truck that includes a cab portion and a bed portion having a floor and a pair of laterally spaced apart side walls extending upwardly from the floor, said truck box and side panel lift apparatus, comprising:

a toolbox situated proximate the cab portion of the pickup truck and having a laterally elongate configuration that extends between the first and second side walls of the bed portion, respectively;

a pair of bed side panels situated inwardly adjacent and parallel to the pair of side walls of the pickup truck, respectively, each one of said pair of side panels having a front end positioned proximate lateral ends of the toolbox, respectively;

a slider assembly that includes a pair support members slidably coupled to said pair of bed side panels adjacent said front ends thereof, respectively, said pair of support members being movable between retracted configurations displaced from said toolbox and deployed configurations positioned underneath said lateral ends of said toolbox, respectively; and a pair of forward lift assemblies each being operatively coupled to said front ends of said pair of bed side panels, respectively, each forward lift assembly having a cylinder and a piston received in said cylinder and slidably movable, when actuated, between a retracted configuration substantially retracted inside said cylinder and an extended configuration substantially extending upwardly out of said cylinder;

wherein an upper end of each piston is attached to a respective bed side panel such that said respective bed side panel is raised when said piston is moved toward said extended configuration.

2. The truck box and side panel lift apparatus as in claim 1, wherein:

said toolbox includes a bottom wall and a plurality of side walls extending upwardly from the bottom wall that, together, define an interior area and an open top in communication with said interior area; and said toolbox includes a lid pivotally coupled to a respective one of said plurality of side walls and is pivotally movable between a closed configuration not allowing access to said interior area and a raised configuration allowing access to said interior area.

3. The truck box and side panel lift apparatus as in claim 1, wherein said pair of support members are displaced rearwardly from said front ends of said pair of side panels, respectively, at said retracted configuration; and said pair of support members extend forwardly away from said front ends of said pair of side panels, respectively, at said deployed configuration.

4. The truck box and side panel lift apparatus as in claim 1, wherein said pair of bed side panels and said toolbox are raised simultaneously when said pair of support members are at said deployed configurations and said pair of forward lifting assemblies are actuated to raise respective pistons.

5. The truck box and side panel lift apparatus as in claim 4, wherein said pair of bed side panels is moved away from said toolbox when said pair of support members are at said retracted configurations and said pair of forward lifting assemblies are actuated to raise respective pistons.

6. The truck box and side panel lift apparatus as in claim 1, further comprising a pair of rearward lift assemblies each being operatively coupled to rear ends of said pair of bed side panels, respectively, each rearward lift assembly having a rear cylinder and a rear piston received in said rear cylinder and slidably movable, when actuated, between a retracted configuration substantially retracted inside said rear cylinder and an extended configuration substantially extending upwardly out of said rear cylinder.

7. The truck box and side panel lift apparatus as in claim 6, wherein said pair of rearward lift assemblies is in electrical communication with said pair of forward lift assemblies, wherein actuation of said pair of rearward lift assemblies simultaneously actuates said pair of forward lift assemblies.

8. The truck box and side panel lift apparatus as in claim 7, further comprising an input device electrically connected to at least one of said pair of rearward lift assemblies for selectively actuating said pair of rearward lift assemblies.

9. The truck box and side panel lift apparatus as in claim 1, further comprising a pair of front support assemblies positioned intermediate said pair of frontward lift assemblies and said pair of bed side panels, respectively, wherein:

said pair of front support assemblies each includes a lower portion attached to the floor of the pickup truck and an upper portion co-linear with said lower portion and coupled to a respective piston of a respective frontward lift assembly;

said upper portion is slidably movable, when actuated, between a lowered configuration adjacent a respective cylinder of a respective frontward lift assembly and a raised configuration extending upwardly away from said lower portion; and said upper portion is coupled to a respective bed side panel such that said respective bed side panel is raised when said upper portion is at said raised configuration.

10. The truck box and side panel lift apparatus as in claim 9, wherein:

said upper portion defines a guide slot having an elongate linear configuration;

said upper portion includes a fastener having a first section fixedly attached to a respective side wall of the bed portion of the pickup truck and a second section slidably coupled to said guide slot such that said upper portion is slidably movable along said guide slot between said lowered configuration and said raised configuration.

11. A truck box and side panel lift apparatus for attachment to a pickup truck that includes a cab portion and a bed portion having a floor and a pair of laterally spaced apart side walls extending upwardly from the floor, said truck box and side panel lift apparatus, comprising:

a toolbox situated proximate the cab portion of the pickup truck and having a laterally elongate configuration that extends between the first and second side walls of the bed portion, respectively;

a pair of bed side panels situated inwardly adjacent and parallel to the pair of side walls of the pickup truck, respectively, each one of said pair of side panels having a front end proximate lateral ends of the toolbox, respectively;

a slider assembly that includes a pair support members slidably coupled to said pair of bed side panels adjacent said front ends thereof, respectively, for slidably moving said pair of support members between retracted configurations displaced from said toolbox and deployed configurations positioned underneath said lateral ends of said toolbox, respectively;

wherein said pair of support members are displaced rearwardly from said front ends of said pair of side panels, respectively, at said retracted configuration and said pair of support members extend forwardly away from said front ends of said pair of side panels, respectively, at said deployed configuration;

a pair of forward lift assemblies each being operatively coupled to said pair of bed side panels, respectively, each forward lift assembly including a piston/cylinder combination coupled to a respective bed side panel that, when energized, operatively moves said respective bed side panel between a lowered configuration bearing against the floor and a raised configuration displaced upwardly from the floor.

12. The truck box and side panel lift apparatus as in claim 11, wherein:

said piston/cylinder combination includes a cylinder attached to the floor of the pickup truck and a piston received in said cylinder and slidably movable, when actuated, between a retracted configuration substantially retracted inside said cylinder and an extended configuration substantially extending upwardly out of said cylinder; and said piston is operatively coupled to a respective bed side panel such that said respective bed side panel is urged toward said extended configuration when said piston is slidably moved toward said extended configuration.

13. The truck box and side panel lift apparatus as in claim 11, wherein:
- said toolbox includes a bottom wall and a plurality of side walls extending upwardly from the bottom wall that, together, define an interior area and an open top in communication with said interior area;
- said toolbox includes a lid pivotally coupled to a respective one of said plurality of side walls and is pivotally movable between a closed configuration not allowing access to said interior area and a raised configuration allowing access to said interior area.

14. The truck box and side panel lift apparatus as in claim 11, wherein:
- said pair of support members are displaced rearwardly from said front ends of said pair of side panels, respectively, at said retracted configuration; and
- said pair of support members extend forwardly away from said front ends of said pair of side panels, respectively, at said deployed configuration.

15. The truck box and side panel lift apparatus as in claim 11, wherein said pair of bed side panels and said toolbox are raised simultaneously when said pair of support members are at said deployed configurations and said pair of forward lifting assemblies are actuated to raise respective pistons.

16. The truck box and side panel lift apparatus as in claim 14, wherein said pair of bed side panels is moved upwardly away from said toolbox when said pair of support members are at said retracted configurations and said pair of forward lifting assemblies are actuated to raise respective pistons.

17. The truck box and side panel lift apparatus as in claim 11, further comprising a pair of rearward lift assemblies each being operatively coupled to rear ends of said pair of bed side panels, respectively, said pair of rearward lift assemblies each having a piston/cylinder combination that is slidably operable, when actuated, between a retracted configuration substantially adjacent the floor and an extended configuration extending upwardly displaced from the floor.

18. The truck box and side panel lift apparatus as in claim 17, wherein said pair of rearward lift assemblies is in electrical communication with said pair of forward lift assemblies, wherein actuation of said pair of rearward lift assemblies simultaneously actuates said pair of forward lift assemblies.

19. The truck box and side panel lift apparatus as in claim 14, further comprising a pair of front support assemblies positioned intermediate said pair of frontward lift assemblies and said pair of bed side panels, respectively, wherein:
- said pair of front support assemblies each includes a lower portion attached to the floor of the pickup truck and an upper portion co-linear with said lower portion and coupled to a respective piston of a respective frontward lift assembly;
- said upper portion is slidably movable, when actuated, between a lowered configuration adjacent a respective cylinder of a respective front support assembly and a raised configuration extending upwardly away from said lower portion; and
- said upper portion is coupled to a respective bed side panel such that said respective bed side panel is raised when said upper portion is at said raised configuration.

20. The truck box and side panel lift apparatus as in claim 19, wherein:
- said upper portion defines a guide slot having an elongate linear configuration;
- said upper portion includes a fastener having a first section fixedly attached to a respective side wall of the bed portion of the pickup truck and a second section slidably coupled to said guide slot such that said upper portion is slidably movable along said guide slot between said lowered configuration and said raised configuration.

\* \* \* \* \*